Aug. 25, 1953 E. PETERSON 2,650,299

DECODER FOR PULSE CODE MODULATION COMMUNICATION SYSTEMS

Filed Sept. 22, 1948

INVENTOR
E. PETERSON
BY
ATTORNEY

Patented Aug. 25, 1953 2,650,299

UNITED STATES PATENT OFFICE 2,650,299

DECODER FOR PULSE CODE MODULATION COMMUNICATION SYSTEMS

Eugene Peterson, New York, N. Y., assignor to Bell Telephone Laboratories, Incorporated, New York, N. Y., a corporation of New York Application September 22, 1948, Serial No. 50,643

6 Claims. (Cl. 250—27)

This invention relates to cathode ray devices and more particularly to such devices especially suitable for use in pulse code modulation communication systems.

In such systems, as disclosed for example in the article by L. A. Meacham and E. Peterson in the Bell System Technical Journal, January 1948, page 1, at a transmitter, speech or other complex waves or signals are coded by converting them into groups of pulses. Specifically, the speech or other complex wave is sampled repeatedly at high frequency and each sample is translated into a code pulse group representative of the amplitude thereof. At a receiver, the code pulse groups are decoded to reproduce the speech or other wave. Specifically, each group is converted into a pulse of amplitude corresponding thereto and, hence, of amplitude proportional to the respective sample of the transmitted signal, and the pulses are combined to reconstruct the signal. As is evident, the fidelity of reproduction is dependent upon the accuracy with which the pulse code groups are decoded or resolved into amplitude modulated signals.

One object of this invention is to accurately decode pulse code modulated signals.

Another object of this invention is to simplify and facilitate the conversion of pulse code modulated signals into amplitude modulated signals.

In accordance with one general feature of this invention, in a decoder for pulse code modulated signals, each pulse in a code group is translated into a charge of preassigned fixed amplitude independent of the amplitude and phase of the pulse and the total charge per unit of time corresponding to the pulse code period is resolved into a signal of the amplitude represented by the code group.

In accordance with a more specific feature of this invention, the decoding is effected by a cathode ray device having a target of a particular configuration and wherein the beam is controlled to pass across the target once for each pulse and in such manner that the beam current to the target is substantially independent of the pulse amplitude and phase.

The above-noted and other features of the invention will be understood more clearly and fully from the following detailed description with reference to the accompanying drawing in which.

Figures 1, 2, 3, 4, 5, 6:
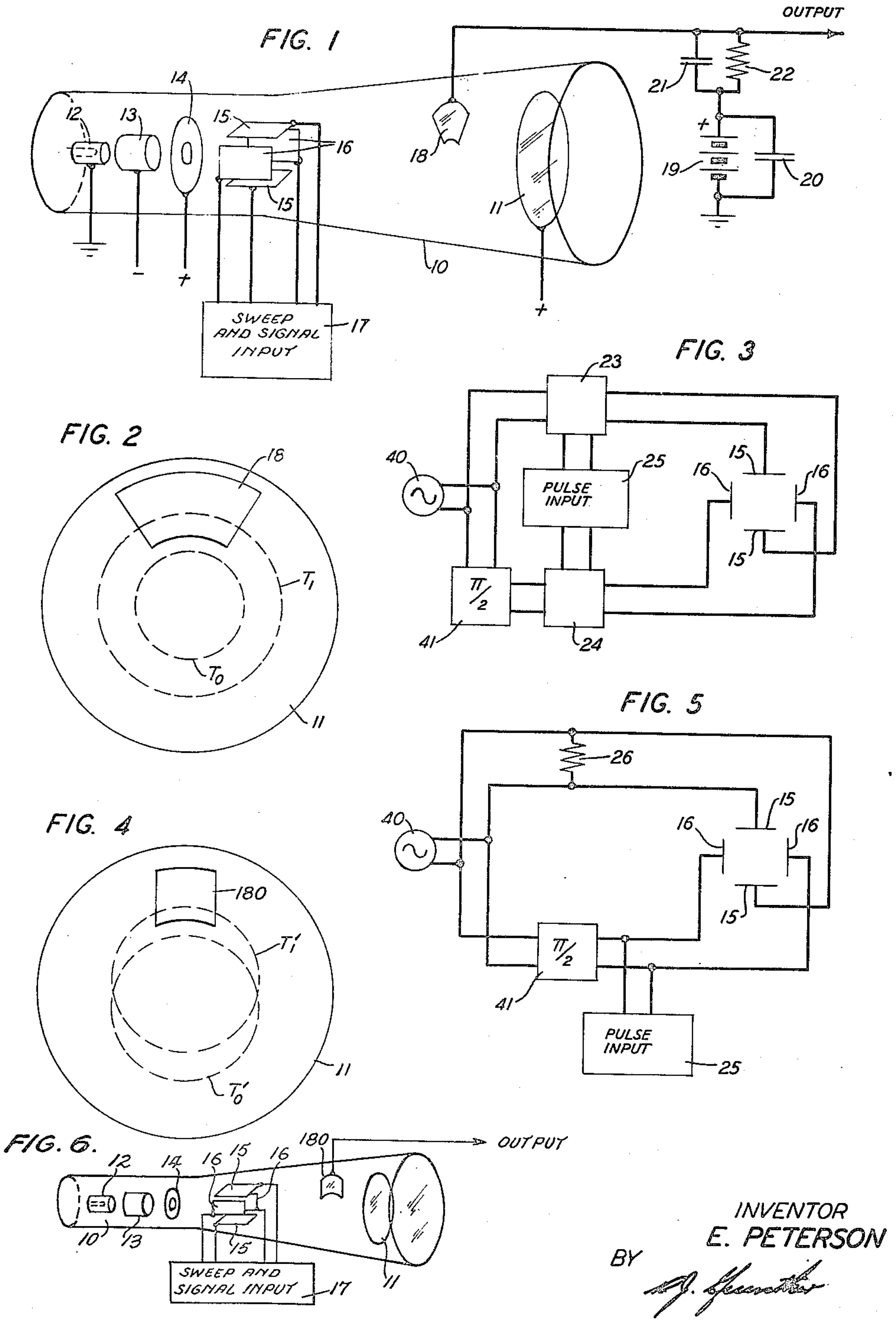
Fig. 1 is in part an isometric view of a cathode ray tube and in part a circuit schematic of a decoder illustrative of one embodiment of this invention.
Fig. 2 is a face view of the target included in the tube illustrated in Fig. 1, typical paths of the electron beam thereat being indicated.
Fig. 3 is a circuit diagram, partly in block form, of one form of beam control system which may be utilized in the apparatus illustrated in Fig. 1.
Fig. 4 is a face view of another target which may be utilized in the device illustrated in Fig. 1.
Fig. 5 is a circuit diagram of a beam control system which may be employed in apparatus including a target of the form illustrated in Fig. 4.
Fig. 6 is in part an isometric view of a cathode-ray tube showing the relative positions of the elements illustrated in Fig. 4.

Referring now to the drawing, the cathode ray device illustrated in Fig. 1 comprises a highly evacuated enclosing vessel 10 having a disc or plate electrode 11 at one end thereof and an electron gun at the other end for projecting a highly concentrated stream of electrons to the electrode 11. The electron gun may be of known construction and for simplicity of illustration is shown as comprising only a cathode 12, a control electrode 13 and an accelerating anode 14.

Disposed adjacent the gun and bounding a space coaxial therewith are two pairs of deflector plates 15 and 16 mounted in space quadrature and connected to a sweep and input circuit 17, which will be described in detail hereinafter.

A generally sectoral target 18 is mounted between the electrode 11 and the electron gun and is displaced from the axis common to the gun and the deflection space. The target 18 serves as the output electrode of the device and is connected to the source 19, bridged by a condenser 20, through a circuit composed of a condenser 21 and resistor 22. The elements 21 and 22 of this circuit are correlated, as disclosed in British Patent 637,848, so that charges placed upon the target 18 per each unit of time, specifically a pulse group period, are resolved into a signal of amplitude determined by the number and time relation of the pulses and proportional to the signal sample represented by the pulse group for that time unit.

The resolution of code pulse groups into output signals will be understood from the following considerations with particular reference to Fig. 2. Assume that the deflector plates 15 and 16 are energized so that the electron beam traverses a path the trace of which in the plane of the target 18 is a circle, indicated at $T_0$ in Fig. 2, which passes beyond and in proximity to the inner edge of the target. For such beam path, no current change is produced in the output circuit. Assume, now, that the beam is controlled so that its trace in the plane of the target is a circle, such as indicated by $T_1$ in Fig. 2, concentric with the first circle. The target will receive a charge of magnitude proportional to the time required for the beam to pass over the target, and a current pulse will be supplied to the output circuits. It will be appreciated that if the rotational velocity of the beam is maintained constant and the sides of the target are radial with respect to the beam trace, the amplitude of the output pulse will be independent of the radius of the trace $T_1$. Thus, if the beam trace is changed from $T_0$ to one such as $T_1$ in response to each input pulse, each input pulse will result in a charge increment of constant amplitude upon the target 18 and a current pulse, also of constant amplitude, to the output circuit. Thus, each code pulse group can be resolved accurately into an output signal of amplitude proportional to that of the sample represented by that group.

The control of the electron beam to effect the resolution above described may be realized in several ways. In one, illustrated in Fig. 3, the deflector plates 15 and 16 are energized from a suitable alternating current source 40 through identical amplitude modulators 23 and 24, such as variable $\mu$ tubes or varistors, a 90 degree phase shifter 41 being included between the source and one of the modulators. Equal voltages, 90 degrees out of phase, thus are impressed upon the two pairs of deflector plates and are made of such value that normally, that is in the absence of input pulses, the beam trace in the plane of the target 18 is a circle such as $T_0$ in Fig. 2 opposite the inner end of the target. The groups of code pulses are applied to both modulators 23 and 24 from the pulse input circuit 25 to vary the deflecting voltages in like manner, thereby to increase the radius of the beam trace at the target plane, to such as $T_1$ in Fig. 2, in response to each input pulse.

The frequency of the beam rotation should be such that the period of one sweep is equal to the time assigned to a single digit interval. For example, in a 12 channel seven digit decoder, wherein the digit period is about $\frac{1}{672{,}000}$ of a second the frequency of the beam rotation should be 672,000 cycles per second.

The control of the beam may be effected also by varying the velocity of the electron beam as it is projected into the deflecting field. For example, the deflector plates 15 and 16 may be energized from a source 40, as described heretofore with reference to Fig. 3, so that normally the beam trace in the target plane is a circle such as $T_0$ in Fig. 2. The code pulses are applied to one of the electrodes of the gun, for example, to the anode 14 in such manner as to reduce the electron velocity, whereby the radius of the beam path is increased and the beam passes across the target, along a path like $T_1$ in Fig. 2, for each pulse.

The invention may be embodied also in devices utilizing a parallel sided target and wherein the diameter of the beam trace at the target plane remains substantially constant. For example, a target 180, as shown in Fig. 4, may be used in place of the target 18 of Fig. 1 and the deflector plates 15 and 16 may be energized so that the beam trace is a circle and normally, that is in the absence of an input pulse, is in proximity to one end of the target. This trace is indicated at $T_0'$ in Fig. 4 and, as shown in this figure, the sides of the target are parallel to and equally spaced on opposite sides of a diameter of the trace. In response to each pulse of a code group, the center of the trace is shifted along the diameter noted so that the beam sweeps over the target, as along the path $T_1'$.

Fig. 6 illustrates the relative positions of elements 180 and 11 shown in Fig. 4. Also shown in Fig. 6 are cathode 12, a control electrode 13, accelerating anode 14, deflection plates 15 and 16, vitreous envelope 10, and the sweep and signal input 17.

A circuit for effecting such displacement of the beam center is illustrated in Fig. 5 and comprises the source 40 for impressing equal, 90 degree out of phase voltages between the pairs of deflector plates 15 and 16, whereby the beam is rotated to produce the circular trace $T_0'$. The code pulse groups are impressed between the deflector plates, to shift the center of the beam trace as described above. In order to maintain the trace $T_1'$ essentially circular, a resistor 26 may be connected across the deflector plates 16 as shown to duplicate the shunting effect of the signal source.

Inasmuch as the beam trace is of substantially constant diameter and the target 180 is of constant width, it will be appreciated that the charge placed upon the target for each input pulse will be of constant magnitude and independent of the pulse amplitude so that faithful decoding of the pulse groups and accurate reproduction of the signal samples represented thereby will be realized.

Although specific embodiments of the invention have been shown and described, it will be understood that they are but illustrative and that various modifications may be made therein. For example, in a modification of the embodiment illustrated in Figs. 1 and 3, the deflector plates 15 and 16 may be utilized only to rotate the beam and the deflection of the beam to pass over the target may be effected by applying the code pulses to a pair of coaxial cylindrical electrodes between the plates 15 and 16 and the target 18 and coaxial with the gun. Similarly, in a modification of the embodiment illustrated in Figs. 4 and 5, the deflection of the beam in response to the code signals may be effected by deflection plates auxiliary to those, 15 and 16, causing the beam rotation. Other modifications may be made in the specific embodiments shown and described without departing from the scope and spirit of this invention as defined in the appended claims.

What is claimed is:

1. A decoder for pulse code modulation communication systems, comprising a first means for projecting an electron beam, a second means for repeatedly sweeping said beam at a fixed frequency over a closed path of preassigned configuration at a plane spaced from said beam projecting means, target means including an element in said plane and having one end thereof in proximity to said path, said element being positioned so that its entire area lies outside the closed path of the electron beam, a source of pulse code groups, means adjacent the beam path between said first means and said target means and energized from said source of pulse code groups to cause a deviation of the beam from said preassigned closed path so that it will pass across the entire width of said element once for each pulse in a code group, the sides of said element being positioned so that all beam traces thereacross are of the same time length, and circuit means connected to said target means and energized in accordance with the beam current to said target means for resolving said current during each period corresponding to that of a pulse code group into a signal of amplitude proportional to that of the signal represented by the respective pulse code group.

2. A decoder in accordance with claim 1 wherein said path is substantially circular, the sides of said element extend radially with respect to said path and said deflecting means effect deflection of said beam radially with respect to said path.

3. A decoder in accordance with claim 1 wherein said path is circular, said sides of said element are parallel to and equally spaced on opposite sides of a diameter of said path and said beam deflecting means effects shifting of the center of said path along said diameter.

4. A decoder for pulse code modulation communication systems, comprising means for projecting an electron beam, output means including a target opposite said projecting means, deflection means including two pairs of deflector plates between said means and said target and in space quadrature, means for energizing said deflection means to repeatedly sweep said beam at fixed frequency over a path of preassigned configuration opposite one end of said target, said target being outside said path the sides of said target being spaced so that all beam traces thereacross of said configuration and substantially uniformly spaced from said path are of the same time length, and a source of pulse code groups connected to said deflection means and effective to cause deflection of said beam so that a portion of the beams trace is intercepted by said target once for each pulse in each group.

5. A decoder in accordance with claim 4 wherein said path is circular, said sides of said target extend radially with respect to said path, said energizing means comprises a source for producing equal voltages 90 degrees out of phase each between a respective pair of deflector plates, and said source of pulse code groups is connected across both pairs of deflector plates.

6. A decoder in accordance with claim 4 wherein said sides of said target are parallel to one another and to the deflecting field between one pair of said deflector plates, and said source of pulse code groups is connected between said one pair of deflector plates.

EUGENE PETERSON.

References Cited in the file of this patent

UNITED STATES PATENTS

| Number | Name | Date |
|---|---|---|
| 2,265,848 | Lewis | Dec. 9, 1941 |
| 2,408,702 | Sziklai | Oct. 1, 1946 |
| 2,429,361 | Labin et al. | Oct. 28, 1947 |
| 2,438,928 | Labin | Apr. 6, 1948 |
| 2,452,157 | Sears | Oct. 26, 1948 |
| 2,465,380 | Labin et al. | Mar. 29, 1949 |